United States Patent [19]

Imagawa

[11] 3,730,963
[45] May 1, 1973

[54] CONSTRUCTION FOR SUPPORTING THE ROTATABLE MEMBERS OF A PIANO ACTION MECHANISM EMPLOYING CARBON FIBER MIXED BUSHING CLOTH

[75] Inventor: Katsuhiko Imagawa, Hamakita, Japan

[73] Assignee: Nippon Gakki Seizo Kabushiki Kaisha, Hamatsu-shi, Shizuoka-ken, Japan

[22] Filed: Dec. 27, 1971

[21] Appl. No.: 212,017

[30]  Foreign Application Priority Data

Dec. 30, 1970   Japan..............................45/133764

[52] U.S. Cl.....................................84/251, 84/452
[51] Int. Cl. ...............................................G10c 3/18
[58] Field of Search..............................84/251, 452; 308/238; 139/426

[56]  References Cited

UNITED STATES PATENTS

| 1,823,142 | 9/1931 | Hickman | 84/251 |
| 2,580,438 | 1/1952 | Knoblaugh | 308/238 |
| 3,565,127 | 2/1971 | Nicely | 139/426 |

OTHER PUBLICATIONS

"Graphite Now Processed In Flexible Textile Form–Applications Limitless," Mechanical Engineering, June 1959, page 121.

Primary Examiner—Richard B. Wilkinson
Assistant Examiner—Lawrence R. Franklin
Attorney—Robert D. Flynn et al.

[57]  ABSTRACT

A piano action mechanism wherein a shaft pin for rotatably supporting the rotatable members on a flange is wound with bushing cloth containing carbon fibers having high lubricity and increased durability.

3 Claims, 3 Drawing Figures

Patented May 1, 1973
3,730,963
FIG. 1
FIG. 3
FIG. 2
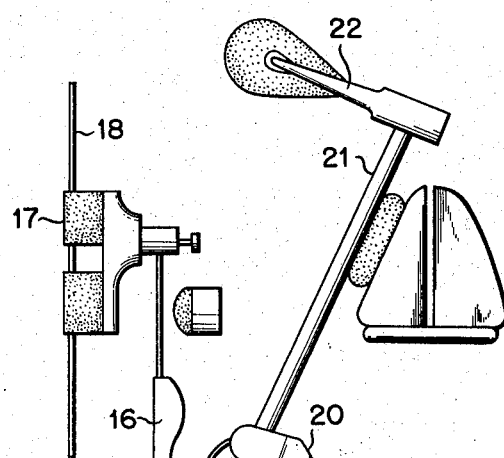
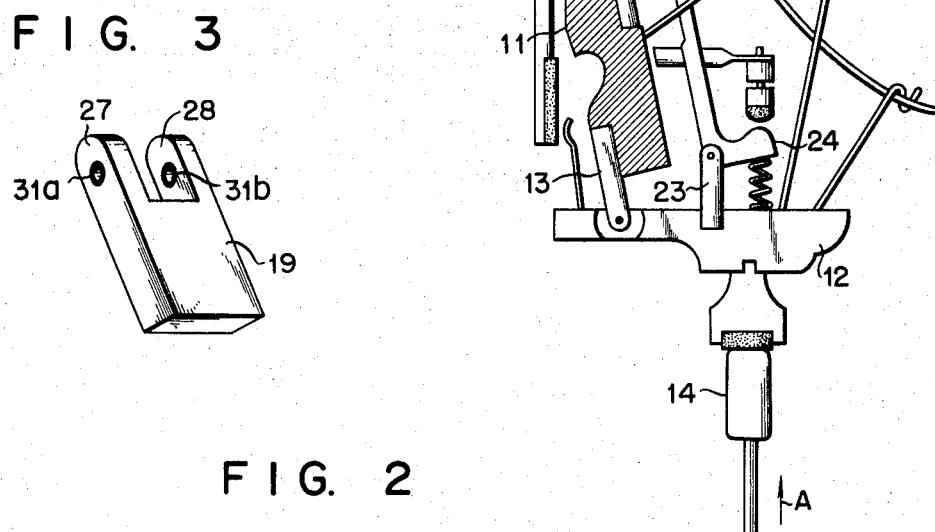
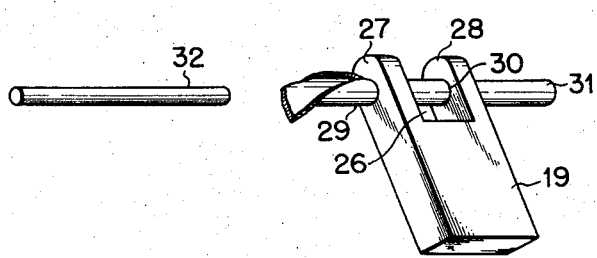

CONSTRUCTION FOR SUPPORTING THE ROTATABLE MEMBERS OF A PIANO ACTION MECHANISM EMPLOYING CARBON FIBER MIXED BUSHING CLOTH

BACKGROUND OF THE INVENTION

This invention relates to a piano action mechanism, and more particularly to a construction for supporting the rotatable parts thereof.

Whether of a grand or upright type, a piano has its action mechanism provided with a bearing section for enabling the parts of the action mechanism to be freely rotated. This bearing section is so constructed as to permit smooth operation of the rotatable parts of the action mechanism. With a conventional piano, the bearing section is provided with bushings consisting of felt rings, the surface of which is coated with silicone or impregnated with suds or soapy water. However, a bearing section having such a construction has the drawback that it will lose lubricity during long use.

It is accordingly the object of this invention to provide a construction for supporting the rotatable parts of a piano action mechanism which is least likely to lose lubricity during long use.

SUMMARY OF THE INVENTION

According to an aspect of this invention, there is provided a construction for supporting the rotatable parts of a piano action mechanism which comprises a support member having a pair of leg portions perforated with mutually facing shaft holes, the leg portions being arranged parallel to each other thereby defining a hollow space therebetween; a rotatable member disposed in the hollow space of the support member and provided with a shaft pin passing through the shaft holes formed in the support member; and bushing means containing carbon fibers, the bushing means being wound about the parts of the shaft pin which are inserted into the shaft holes.

According to this invention, the bushing means wound about the shaft pin contain carbon fibers having high lubricity and increased durability, thereby maintaining the prominently improved smooth movement of the rotatable members for a long period.

BRIEF DESCRIPTION OF THE DRAWINGS

FIG. 1 is a side view of an ordinary upright piano action mechanism, partly in section;

FIG. 2 is an exploded perspective view of a bearing section according to this invention adapted for use with the piano action mechanism of FIG. 1, bushing cloth being inserted in the shaft holes bored in a support member so as to be cut in the bushing; and FIG. 3 is a perspective view of the support member with the bushings inserted in the shaft holes.

DETAILED DESCRIPTION OF THE INVENTION

FIG. 1 illustrates the action mechanism of an upright piano. Though well known, the action mechanism will now be briefly described for a better understanding of this invention. Below a fixed central rail 11 is disposed a wippen assembly 12 swingably supported by means of a flange 13. The wippen assembly 12 is selectively operated by a capstan button 14 urged by a keyboard mechanism (not shown) in the direction of the indicated arrow A. To the common central rail 11 are fitted the same number of wippen assemblies 12 as that of the keys of the keyboard mechanism. To the upper end of the central rail 11 is fitted a damper flange 15 to which there is rotatably connected a damper lever 16. This damper lever 16 rotates about the damper flange 15 as the result of the swing of the wippen assembly 12, bringing a damper 17 out of contact with a string 18, so that the string 18 is fully vibrated by being struck by a hammer 22. To the central rail 11 is further fitted a butt flange 19, which in turn rotatably supports a butt 20. On the butt 20 is erected a shank 21 provided with the hammer 22 at the end. To the wippen assembly 12 is connected a jack flange 23, to which there is rotatably fitted a jack 24. This jack 24 rotates as the result of the swing of the wippen assembly 12. The rotation of the jack 24 leads to the swing of the butt 20, thereby causing the hammer 22 to strike the string 18.

In the aforementioned piano action mechanism, the rotatable members such as the wippen assembly 12, damper lever 16, butt 20 and jack 24 have to be rotatably supported by the associated flanges. This invention is intended to improve such a rotatably supporting mechanism.

There will now be described by reference to FIGS. 2 and 3 a mechanism according to this invention for rotatably supporting the aforesaid rotatable parts. Referring to FIGS. 2 and 3, the butt flange 19 is taken as an example of the various flanges for supporting the rotatable parts as shown in FIG. 1. It will be noted that the other flanges are of substantially the same construction. As shown in FIG. 2, the flange 19 has a pair of parallel leg portions 27 and 28 formed at one end which jointly define a hollow space 26. The leg portions 27 and 28 are bored at the center with shaft holes 29 and 30 facing each other through the hollow space 26. Into these shaft holes closed to the inner walls thereof is first inserted a piece of bushing fabric or cloth 31 which is woven from mixed spun yarns mainly comprised of natural fibers such as wool with which there are mixed carbon fibers having high lubricity, the carbon fibers being napped on the surface of the fabric. Those parts of the bushing cloth which are not located within the shaft holes 29 and 30 of the flange 19 are then cut off, so that bushings 31a and 31b are disposed in the shaft holes 29 and 30 as shown in FIG. 3.

The rotatable butt 20 is then fitted to the flange 19 of the above-mentioned construction. The butt 20, which is also bored with a hole (the butt being omitted from FIG. 2 to simplify the drawing), is placed in the hollow space 26 defined between the leg portions 27 and 28 in such a manner that the hole of the butt 20, and the shaft holes 29 and 30 of the paired leg portions 27 and 28 are linearly aligned. Thereafter there is introduced a shaft pin 32 through the linearly aligned holes, obtaining the construction of FIG. 1 for rotatably supporting the butt 20. The supporting construction for the other rotatable parts is formed in a similar manner.

For the object of this invention, bushing cloth wound about the shaft pin by being inserted into the shaft holes may be a fabric or cloth woven from the warp of carbon fibers alone and woof of natural fibers such as wool, and vice versa, followed by napping.

What is claimed is:

1. A construction for rotatably supporting a piano action mechanism which comprises a supporting member having a pair of leg portions perforated with mutually facing shaft holes, said leg portions being arranged parallel to each other, thereby defining a hollow space therebetween; a rotatable member placed in said hollow space of said supporting member and provided with a shaft pin passing through said shaft holes of said supporting members; and bushing means comprised of a fabric containing carbon fibers, said bushing means being wound about the parts of said shaft pin which are inserted into said shaft holes.

2. A construction according to claim 1, wherein said bushing means is a fabric woven from mixed spun yarns of wool fibers and said carbon fibers, said fibers being napped on the surface of the fabric.

3. A construction according to claim 1 wherein said bushing means is a fabric woven from warp and woof, at least one of the warp and woof consisting of said carbon fibers alone, said fibers being napped on the surface of the fabric.

* * * * *